United States Patent [19]
Walker

[11] Patent Number: 5,740,551
[45] Date of Patent: Apr. 21, 1998

[54] MULTI-LAYERED BARRIER GLOVE

[75] Inventor: Philip E. Walker, Wilmington, Del.

[73] Assignee: W. L. Gore & Associates, Inc., Newark, Del.

[21] Appl. No.: 661,275

[22] Filed: Jun. 10, 1996

[51] Int. Cl.$^6$ ....................................... A41D 13/10
[52] U.S. Cl. ..................... 2/16; 2/161.6; 2/164; 2/167
[58] Field of Search ................. 2/159, 161.6, 164, 2/167, 904, 16; 428/245, 246, 253, 261, 267

[56] References Cited

U.S. PATENT DOCUMENTS

| | | |
|---|---|---|
| 3,953,566 | 4/1976 | Gore . |
| 4,187,390 | 2/1980 | Gore . |
| 4,545,841 | 10/1985 | Jackrel ............................ 2/167 |
| 4,847,918 | 7/1989 | Strum ............................... 2/167 |
| 5,024,594 | 6/1991 | Athayde et al. .............. 428/246 |
| 5,349,705 | 9/1994 | Ragan ........................... 2/161.1 |
| 5,391,426 | 2/1995 | Wu . |
| 5,442,818 | 8/1995 | Loos ................................ 2/169 |
| 5,568,656 | 10/1996 | Kim ................................. 2/164 |

FOREIGN PATENT DOCUMENTS

| | | |
|---|---|---|
| 0 227 384 | 7/1987 | European Pat. Off. . |
| 311747 | 4/1989 | European Pat. Off. ............ 2/904 |
| 0 724 848 | 8/1996 | European Pat. Off. . |
| 93/05670 | 4/1993 | WIPO . |

*Primary Examiner*—C. D. Crowder
*Assistant Examiner*—Larry D. Worrell, Jr.
*Attorney, Agent, or Firm*—Victor M. Genco, Jr.

[57] ABSTRACT

A multi-layered barrier glove having high tactility and dexterity characteristics includes an outer shell fabricated from relatively flexible and durable material, and a barrier insert disposed underneath the shell and fabricated from gas permeable, liquid impermeable material. An inner layer or insert may further be provided for adding comfort to the wearer. Specifically, the outer shell is a knit glove made out of aramid fibers for providing durability, cut resistance, and fire resistance identified by non-melt and non-flammable properties. The barrier insert is fabricated from porous polytetrafluoroethylene ("PTFE") that is shaped to fit inside the outer shell. The barrier insert provides the user with the barrier protection to protect the user's skin, while still maintaining the breathability.

2 Claims, 3 Drawing Sheets

MULTI-LAYERED BARRIER GLOVE

FIELD OF THE INVENTION

This invention generally relates to liquid impermeable gloves, and more particularly to a multi-layered barrier glove which, in addition to being liquid impermeable, exhibits high tactility and dexterity characteristics when used.

BACKGROUND OF THE INVENTION

The present invention relates to the construction of a glove allowing for high dexterity and tactility when used. In the past, anyone having to touch, use, or be in the presence of any material that is toxic or hazardous to the skin would be obligated or well advised to wear some form of an occlusive gauntlet-type glove in order to protect the skin. Such gloves can be found in many forms, but are typically known as the black or yellow butyl rubber gloves which are commercially available. This type of glove has not changed much over the last half century, and continues to provide the wearer with an admirable amount of protection from harmful and toxic elements.

Unfortunately, the gauntlet-type glove described above does have some associated disadvantages. Depending on its specific end use, sometimes the glove must be worn for periods of time greater than one half hour. For example, chemical warfare clothing usually needs to be donned for periods of hours, until the contaminated area can be evacuated, or the chemical threat no longer exists. Additionally, any chemical that needs to be mixed and applied such as paints, or environmental poisons (insecticides, weed killers, etc.), require the user to wear the gloves for extended periods of time. Unfortunately, the impermeable nature of these "rubber" gloves can cause great distress to the user. After less the five minutes, the user can experience significant perspiration accumulation inside the glove. The hot and clammy microclimate inside the glove induces hand discomfort and decreases the tactility of the glove because of the low frictional coefficient provided at the juncture of the finger and the inside of the rubber glove. The rubber in the glove also acts as an insulator causing the wearers' hands to become uncomfortably warm in most climates in just a few minutes.

The U.S. military defines four levels of chemical clothing readiness. The highest level of readiness, known as MOPP ("mission-oriented protective posture") level 4 in the military, requires the soldier to wear protective gloves in addition to other protective gear (i.e., a chemical suit, a protective mask and hood, and protective boots). It is possible for a soldier to remain in a lower level of readiness, e.g., MOPP level 3, at rest for about 60 to 120 minutes without extreme discomfort. Once the prior art rubber gloves described above are donned for achieving MOPP level 4 status, the soldiers can physically remain in the suit for about 30 minutes or less before conditional environmental factors such as heat, fatigue, etc. require the soldiers to reduce their level of readiness. The gloves, when worn, definitely limit the time duration a soldier can operate in a full protective posture.

Since the glove must be easily donned and doffed, the prior art rubber glove is oversized. The oversized glove also allows the hand to "breath" by not holding the perspiration directly against the hand. To maintain durability, the glove is designed with a thickness of about 0.2 to 0.6 millimeters. Unfortunately, the oversized nature of the rubber glove, and the thickness of the glove material itself, severely limits tactility and dexterity. Occasionally, the user will wear a cotton or cotton blend liner glove underneath the rubber glove. While the liner glove may extend the time until the user feels perspiration accumulation, it does not extend the glove's usable time allowance, nor does it increase or enhance the dexterity characteristics of the glove. Depending on the type of material used in the construction of the glove, it may also be susceptible to degradation caused by petroleum products, oils and lubricants, and ultraviolet degradation. This degradation of the gloves can prove to be highly unacceptable to users working around such materials.

While there have been attempts to make improvements to this type of glove, none have been able to maintain the barrier properties of the impermeable glove while providing equal or superior durability, moisture vapor transfer allowing the perspiration evacuation, and providing a better fit to improve the tactility and dexterity of the glove.

One such glove, that is now in production as a chemical agent protective glove features a cut and sew glove constructed out of an activated carbon foam material that can absorb agent vapor. Unfortunately, this glove is not liquid impermeable, and thus any caustic liquid could penetrate the glove and reach the user's hand. Additionally, due to the relatively fragile nature of the carbon foam material, the durability of the glove is questionable.

Another well-known knit or knit-type glove is directed to the hunting market. The construction of this glove is designed with much heavier deniers of fibers to provide high insulation. Thus, the glove works very poorly for high tactility and dexterity operations due to its thick nature. Additionally, it is not designed as a barrier product.

The foregoing illustrates limitations known to exist in present glove designs. Thus, it is apparent that it would be advantageous to provide an improved barrier glove directed to overcoming one or more of the limitations set forth above. Accordingly, a suitable alternative is provided including features more fully disclosed hereinafter.

SUMMARY OF THE INVENTION

The present invention advances the art of barrier gloves, and the techniques for creating such gloves, beyond which is known to date. In one aspect of the present invention a multi-layered barrier glove having improved tactility and dexterity characteristics comprises an outer shell fabricated from relatively flexible and durable material, and a barrier insert disposed underneath the shell and fabricated from gas permeable, liquid impermeable material for protecting the user's skin. An inner layer or insert may further be provided for adding comfort to the wearer.

Specifically, the present invention provides an improved barrier glove wherein the outer shell is a knit glove made out of aramid fibers for providing durability, cut resistance, and fire resistance identified by non-melt and non-flammable properties. The shell material should maintain a specific maximum thickness to ensure maximum tactility, and may also have various gripping dots applied to the surface to maximize gripping and holding ability. The barrier insert is preferably fabricated from porous polytetrafluoroethylene ("PTFE") that is shaped to fit inside the outer shell. The barrier insert provides the user with the barrier protection for preventing toxic and/or nontoxic fluids from contaminating the skin, while still maintaining breathability. The inner layer of the glove is a knit liner constructed out of a softer fiber such as a cotton or a cotton-polyester blend. The three layers of the glove are attached to each other by various methods including tabs, adhesives, and remeltable tapes, to eliminate any tendency for the lining of the glove to invert when the glove is removed. The three layers are stitched at the cuff to complete the glove.

It is, therefore, a purpose of the present invention to provide an improved barrier glove which protects the user from harmful chemicals and other related materials while removing perspiration therefrom.

Another purpose of the present invention is to provide a barrier glove which has enhanced tactility and dexterity characteristics.

Yet another purpose of the present invention is to provide a barrier glove which is comfortable to wear.

A further purpose of the present invention is to provide a barrier glove which is suitable for military purposes in that it is durable in construction.

Another purpose of the present invention is to provide a barrier glove which is easy and cost-efficient to manufacture.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
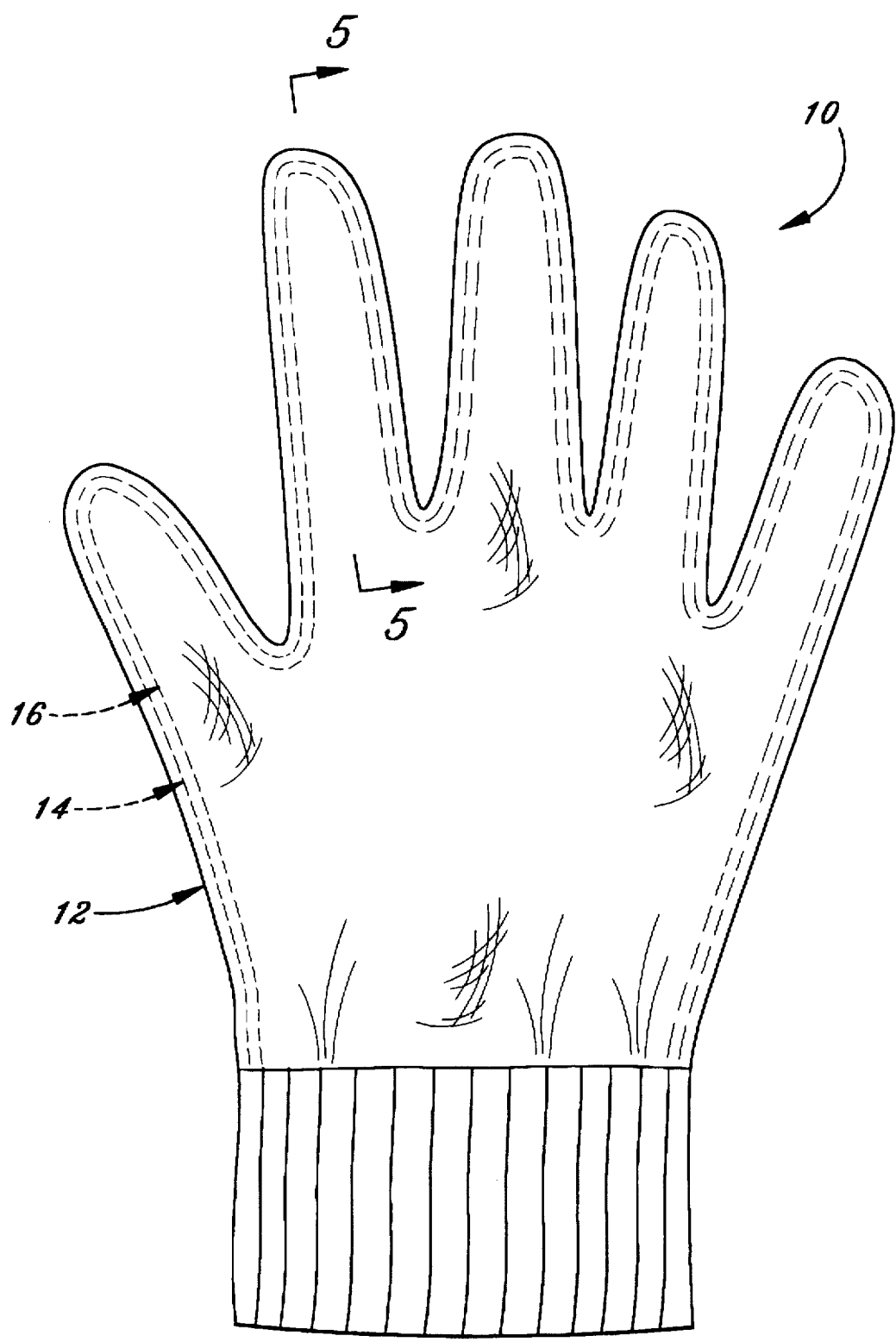
FIG. 1 is a top plan view of the barrier glove of the present invention.
Figure 2:
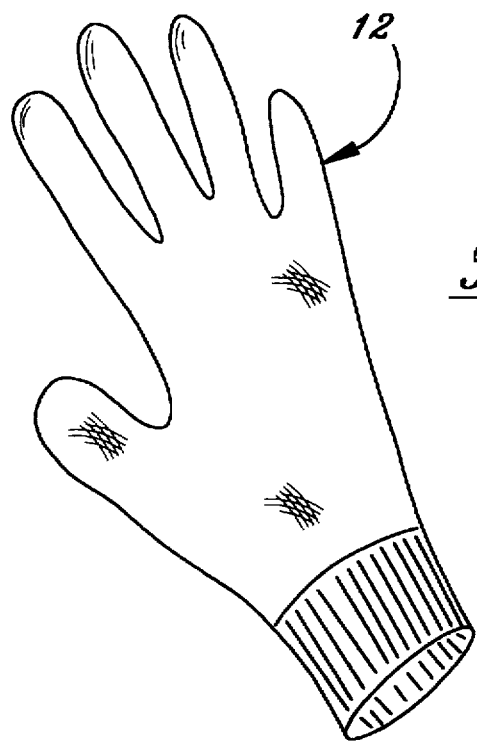
FIG. 2 is a top plan view of an outer layer of the glove.
Figure 3:
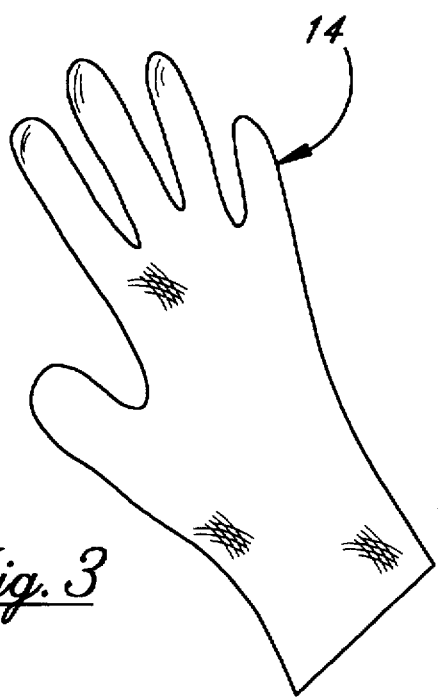
FIG. 3 is a top plan view of a barrier insert of the glove.
Figure 4:
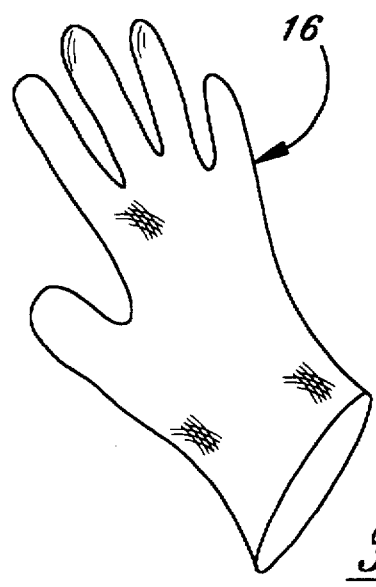
FIG. 4 is a top plan view of an inner layer or insert of the glove.

Referring now to the drawings, wherein similar reference characters designate corresponding parts throughout the several views, the barrier glove of the present invention is generally illustrated at 10 in FIG. 1. In a preferred embodiment of the invention, the glove 10 includes three components, an outer layer or shell, generally indicated at 12, a protective intermediate barrier insert, generally indicated at 14, which is disposed within the shell, and an inner layer or insert, generally indicated at 16, which is disposed next to the user's skin when worn. FIGS. 2–4 illustrate the shell 12, barrier insert 14 and inner layer 16 in separate form, respectively. However, it should be noted that the barrier glove 10 of the present invention can be fabricated from only the shell 12 and barrier insert 14 and still fall within the scope of the present invention since the inner layer 16 is provided for enhancing the comfortability and wearability of the glove, but not its functional capabilities.

The outer layer 12 of the glove, which, as described above, is referred to as the shell, is preferably knitted out of aramid fibers, and can be constructed with a number of different types adhesive patterns on the outer surface to provide added durability and gripping ability. Although aramid fibers are the preferred embodiment of the shell 12, any fiber providing the same critical features, such as tactility, flexibility, durability, and fire resistance of the aramid, are suitable for the purposes of the present invention as a replacement fiber. The shell 12 can comprise either in its entirety, or in-part the knitted material. This allows several constructions including different palm materials and patches placed on strategic portions of the glove 10 to name a few examples.

In a desired configuration, the shell 12 is preferably knitted with a jersey weft knit, allowing for ample stretch. Other knits, such as tricot and double knit, may be used, but could provide less favorable results. Additionally, the individual fibers constituting the shell 12 provide optimal functionality when they are 10 denier; this is an industry measurement in which 9000 meters of fiber equals 10 grams and the dimension of the fiber bundle is actually a thickness of about 0.7 mm. Given the knit required for the shell 12, and the weight of the fiber, the optimal thickness dimension of the shell is about 0.6 mm, with the functionality range being from about 0.1 mm to 3.0 mm.

The shell 12 is typically knitted on special glove knitting machines that fabricate the entire glove as one complete piece. This method of manufacturing the shell 12 is desirable since it provides a seamless glove. In this regard, seamed shells may have a tendency to limit the tactility and dexterity of the user by causing bumps and binding in the shell of the glove, and could inhibit hand functions. The shell 12 described herein may be the preferred embodiment, but other shell manufacturing processes will work within the scope of this invention.

As best illustrated in FIGS. 1 and 2 but not designated with reference numerals therein, the shell 12 may include any of the following: a palm portion, a dorsal or back portion, finger stalls or passageways, a thumb stall or passageway, and a portion covering the wrist which defines an opening facing inwardly of the wearer. It should be noted that the barrier insert 14 and inner layer 16 each may include these glove features as well. Although the glove shell 12 is illustrated as a conventional glove, in the sense that it includes an individual finger stall for each finger of a human hand and a thumb stall, the teachings of the present invention may be applied to other glove designs having less than four finger stalls, but at least one (e.g., a mitten design). Additionally, the shell 12 may be provided with an elastically yielding area or draw strap (not shown) proximate the portion covering the wrist to provide close contact of the entire glove to a wearer's wrist.

The knitted aspect of the shell 12 allows it to be very conformable to the wearer's hand. Not only does the knit allow the shell 12 to stretch when the wearer dons the glove 10 or flexes the hand, the knit also provides a very even pressure over the entire hand regardless of how much stretch has been applied to the knit. Most stretchable or yielding woven materials or monolithic materials used in a cut and sew glove construction similar to the knitted shell 12 would not provide an even pressure but would typically provide a proportional pressure to the amount of stretch. Basically, the areas of the hand where the material has to stretch more to accommodate the size or the movement of the hand would feel significantly tighter with a stretchy woven than with a jersey knit. With this ability of the knit to stretch but also apply uniform pressure over the surface of the hand, only a couple of shell sizes are needed to fit the entire range of the user population.

Figure 5:
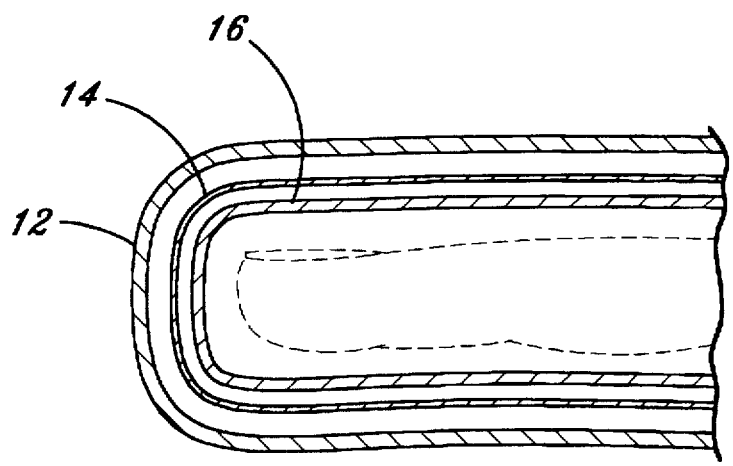
FIG. 5 is a cross-sectional view taken along line 5—5 of FIG. 1, the wearer's finger being illustrated in broken lines.
Figure 6:
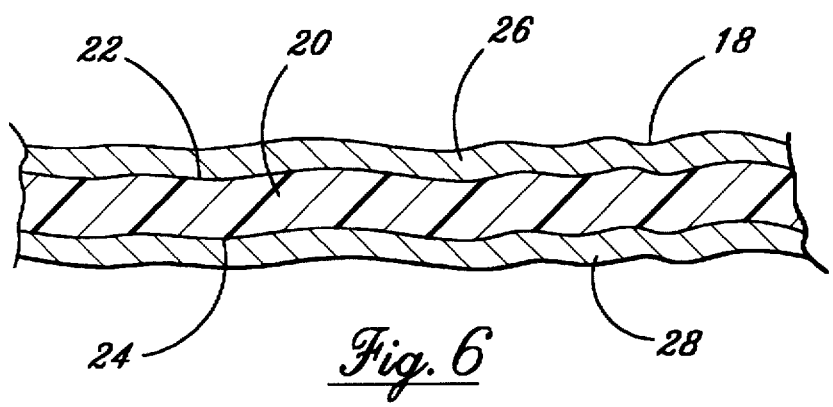
FIG. 6 is a cross-sectional view of the barrier insert of the glove.

The barrier insert 14 is fabricated from a gas permeable, liquid impermeable material, and a material suitable for use in the glove 10 for protecting a wearer from noxious liquids and gases. Referring to FIGS. 5 and 6, a material suitable for making the barrier insert 14 may be made of a laminate 18 comprising a membrane 20 of porous polytetrafluoroethylene ("PTFE") having first and second membrane sides 22, 24, respectively. A 1.0 oz./sq. yd co-polyester nonwoven layer 26 is bonded to the first membrane side 22, and a 0.5 oz/sq. yd nylon nonwoven layer 28 is bonded to the second membrane side 24. It should be noted that the layers 26, 28 can be bonded onto their respective sides 22, 24 of the membrane 20 in any suitable manner. The PTFE barrier insert 14 may also be comprised of nodes interconnected by fibrils. Such an insert 14 may be made in accordance with the teachings of U.S. Pat. No. 4,187,390 or U.S. Pat. No. 3,953,566, which are incorporated herein by reference. In general, the barrier insert 14 is approximately 1 to 4 mils thick.

Figure 7:
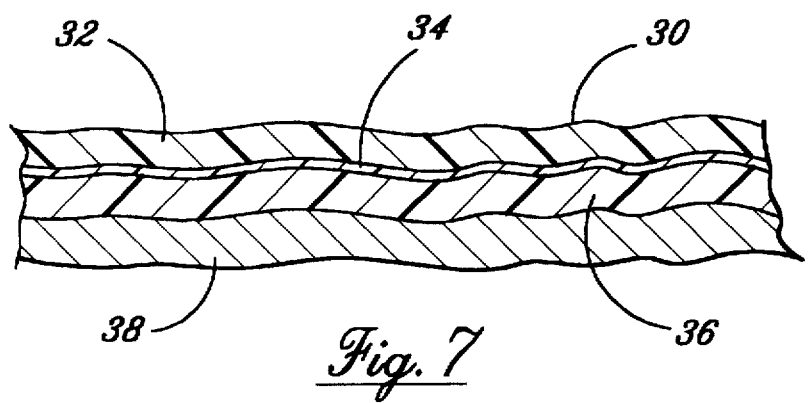
FIG. 7 is a cross-sectional view of the barrier insert of another preferred embodiment.

Turning to FIG. 7, another barrier material suitable for use in the glove 10 as the barrier insert 14 for protecting a user from noxious gases or liquids is described in detail in U.S. Pat. No. 5,391,426, which is also incorporated herein by reference. Briefly, as represented in FIG. 7, such a barrier material may comprise a laminate 30 having the following sequence of layers:

(a) a first pliable porous substrate 32 of PTFE having a thickness of from about 1 to about 2 mils;

(b) a gas blocking water vapor permeable polymeric coating 34 applied on one surface of the substrate (cross-linked polyethyleneimine); and (c) a second pliable porous substrate 36 of porous PTFE having a thickness of from about 1 to about 2 mils applied to the polymeric coating.

Such a composite barrier insert 14 made from laminate 30 may be combined with a backing and/or facing fabric 38. The backing and/or facing fabric 38 may be constructed from any material, such as woven or nonwoven textiles, or knits. The fabric 38 can be treated with water and oil repellents or with the gas-blocking polymer, or with both. Flouroacrylate water repellents are one preferred class of coating on the fabric. Representative fluoroacrylates are available from companies such as E. I DuPont de Nemours and Co. (Zonyl compositions) or ICI Co. (Milease compositions).

The inner layer or insert 16 eliminates the user's hand from contact with the oversized barrier insert 14 and provides a comfortable inner gripping surface that conforms tightly to the user's hand, and a surface that is pleasant to the touch. It is important that this inner layer 16 be as thin as possible, breathable and lightweight, while still maintaining adequate durability. Thus, the preferred embodiment of this inner layer 16 is a knitted cotton or a cotton/polyester glove with about a 4 grams per 9000 meters weight fiber (4 denier). The preferred knit is a double knit, but a tricot, a different warp knit, or any other knit allowing adequate stretch and distension properties are adequate.

The construction of the inner layer 16 is preferably knitted in one process, thus, no seams are created. The seamless inner layer 16, as with the shell 12, is preferably formed as one piece with no seams to enhance the tactility and dexterity of the glove. Areas of high wear are experienced in the vicinity of seams in standard glove constructions. However, this invention should not be limited to only inner layers created in such seamless fashions. The scope of the invention is open to all methods of construction of the inner layer 16, including but not limited to: cut and sew creation of the lining by sewing many pieces of knitted material to create a three dimensional inner layer; and the sewing of a continuous outline of a glove or hand providing a two dimensional hand pattern from two pieces of flat knitted material.

The inner layer 16 is sized to fit the correct size of the wearer's hand since this component of the glove is worn directly against the skin. The inner layer 16 operating thickness of the fiber bundle used is about 0.1 millimeters, which translates to an overall inner layer thickness of about 0.45 mm, but the functionality range of the thickness of the fiber bundles is from about 0.05 mm to about 1.0 mm. Although not the preferred embodiment, the glove 10 can be created without using an inner layer 16. Although the comfort of the user could be affected by the bulkiness of the barrier insert 14, the glove 10 will still function properly.

In order to prevent the barrier insert 14 and the inner layer 16 from being inverted with respect to the shell 12 when the glove 10 is doffed, it is preferred that they are secured to the shell. This can be done is a number of different ways, and the suggestions described herein are in no way intended to limit this invention to only using these methods of liner retention. If the barrier insert 14 represented in FIG. 6 is created in such a way that the laminate 18 consists of a remeltable, stretchable (e.g., beyond 200%) co-polyester layer 26 on both the inner surface 24 (towards the inner layer 16) and the outer surface 22 (facing the shell 12), the insert 14 can be heated in such a way that the co-polyester textile will melt itself into both the shell and the inner layer, thus creating an effective means of liner retention. This method can be used to secure both sides of the barrier insert 14, but could be used to just secure the shell side or the inner layer side leaving the other side to be secured by one of the following methods, or something different altogether.

Another suitable method is to secure the barrier insert 14 to the shell 12 with adhesive drops. For example, silicone adhesive could be applied to each of the fingers of the barrier insert 14. Then the shell 12 is assembled over the barrier insert 14, and the adhesive is allowed to dry. Thus, the barrier insert 14 cannot be pulled from the shell 12. A similar method could be used to secure the inner layer 16 to the barrier insert 14.

Another preferred method of securing the barrier insert 14 to the shell 12 and/or inner layer 16 is to utilize a tabbing attachment method. With this method, the barrier insert 14 is constructed such that extra material is provided on the tips of each on the fingers. The shell 12 is then be inverted such that the insides of the fingers are laid over the ends of the barrier insert 14. The two pieces are then stitched together in an appropriate manner. The shell 12 is inverted over the barrier insert 14, which in turn is then fixed to the shell. A modified version of this method can secure the insert 14 to the inner layer 16 by stitching the insert tabs (not shown) to the inner layer 16 and then inverting the barrier insert 14 over the inner layer.

Yet another method of liner retention that can be used is similar to the first method described by using the remeltable laminate material. Using the same set-up procedures as the first method, the barrier insert 14 can be affixed to either the shell 12 or the inner layer 16 by using a separate remeltable material that can be laid between the layers and heated causing a melting and a bonding of the layers.

Without intending to limit the scope of the present invention, the apparatus and method of production of the present invention may be better understood by referring to the following examples:

EXAMPLE 1

A large seamless black aramid jersey knit shell with 10 denier fibers (equivalent to about 0.7 mm thickness of the fiber bundles and about 0.6 mm thickness of the knit package) is provided. A thermally sealed barrier insert with remeltable laminate co-polyester (stretch 200%) components on both the inside and outside thereof is further provided. A single seamed cotton inner layer or insert is created with a double knit with a fiber bundle thickness of about 0.1 mm and an overall knit thickness of about 0.45 mm.

A "dummy" hand was used for the assembly and interconnecting of the layers of the glove. The dummy hand provides the assembler with a stationary hand to pull and orient the glove layers as needed to assemble the glove properly.

First, the cotton inner layer was positioned on the dummy hand and seated properly. Proper seating is defined as requiring all of the crotches of the inner layer rest at the crotches of the dummy hand. Next, the barrier insert was placed on the hand over the inner layer with the barrier insert sitting properly on the inner layer (i.e., the crotches of the barrier insert rest firmly on the crotches of the inner layer to eliminate stress points when the glove is completed and worn by an end user). Finally, the aramid shell was stretched and pulled on top of the other two layers and checked to ensure it was seated properly with no twisting.

The assembled glove was carefully removed from the dummy hand, making sure not to pull out any fingers, or disrupt the configuration of the glove. It was then taken to a heated press at a temperature between 250° F. and 400° F. A pressure force of about 2 pounds per square inch was applied to the glove. The palm of the glove was heated first for about 10 seconds. Next, each of the fingers were heated for about 10 seconds. The heat and pressure allowed the remeltable laminate materials of the barrier insert to melt and bond with both the shell of the glove, and the inner layer thereof. This sealing of the shell and inner layer with the barrier insert prevents the glove from inverting when the hand is removed, and gives the wearer the feeling that the glove is constructed of one single piece, as opposed to three separate layers.

The entire glove was then sewn at the cuff to finish the construction process.

EXAMPLE 2

A Nomex® and leather "aviator" style glove was used for the second example as the shell. The Nomex® material is a fire resistant material, and is knitted with a double knit with an overall thickness of about 0.8 mm and a fiber thickness of about 0.2 mm. The palm portion of the shell is created from a very soft and somewhat stretchable "kid" leather having an approximate thickness of 0.7 mm. The other components of the example remain the same as example 1 except that the barrier insert does not have any remeltable laminate properties.

The tips of each of the fingers of the cotton inner layer were sewn to tabs provided in the above-described manner on the ends of the fingers of the barrier insert. The cotton inner layer was then placed on the dummy hand, and the barrier insert was inverted over the cotton inner layer so that it was inside-out. Next, some dabs (about 5–10 mm in diameter) of silicone adhesive (DOW Corning Industries No. 732) were placed at the tips of each of the fingers. The shell was then pulled over the entire package making sure the fingers were seated well against the adhesive and the insert. The cuff of the glove was sewn to hold the three layers together, and the glove was allowed to dry to the liner retention.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A multi-layered barrier glove comprising:

an outer shell fabricated at least in part from aramid fibers; and a barrier insert disposed underneath the shell and fabricated from a gas permeable, liquid impermeable laminate having a membrane fabricated from porous PTFE, said membrane having a first side with a co-polyester nonwoven layer bonded thereto and said membrane having a second, opposite side with a nylon nonwoven layer bonded thereto.

2. A barrier glove as set forth in claim 1, said nylon nonwoven layer having a weight of 0.5 ounce per square yard.

* * * * *